(12) United States Patent
Ambrose et al.

(10) Patent No.: US 7,981,515 B2
(45) Date of Patent: Jul. 19, 2011

(54) BIS EPOXY POLYESTERS AND FOOD CANS COATED WITH A COMPOSITION COMPRISING SAME

(75) Inventors: Ronald R. Ambrose, Pittsburgh, PA (US); Ken W. Niederst, Allison Park, PA (US); John M. Dudik, Apollo, PA (US); Mary Ann M. Fuhry, Butler, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1092 days.

(21) Appl. No.: 11/442,866

(22) Filed: May 30, 2006

(65) Prior Publication Data
US 2007/0281179 A1 Dec. 6, 2007

(51) Int. Cl.
*B32B 15/08* (2006.01)
*C08G 59/16* (2006.01)
*C08G 63/06* (2006.01)
*C08L 63/00* (2006.01)
*C08L 63/10* (2006.01)
*C08L 67/04* (2006.01)

(52) U.S. Cl. ........ 428/418; 428/458; 525/445; 525/451; 528/100

(58) Field of Classification Search ................ 525/437; 428/416, 480
See application file for complete search history.

(56) References Cited

U.S. PATENT DOCUMENTS

| | | | | |
|---|---|---|---|---|
| 4,212,781 A | * | 7/1980 | Evans et al. | 523/403 |
| 4,943,359 A | * | 7/1990 | Patzschke et al. | 204/479 |
| 5,739,215 A | * | 4/1998 | Westerhof et al. | 525/438 |
| 2002/0015770 A1 | * | 2/2002 | Moretti | 426/324 |

* cited by examiner

*Primary Examiner* — Robert Sellers
(74) *Attorney, Agent, or Firm* — Diane R. Meyers

(57) ABSTRACT

Polyesters comprising the reaction product of a polyol and a bis-epoxy reacted with a mono- and/or di-phenolic carboxylic acid and/or ester are disclosed. Food cans coated at least in part on the interior with a composition comprising these polyesters are also disclosed. The composition used on the food cans is substantially free of BPA and BPF and substantially free of BADGE and BFDGE. Food cans coated at least in part on the interior with a composition comprising a polyester having a loss of molecular weight of less than 50% in an acidic medium are also disclosed.

24 Claims, No Drawings

BIS EPOXY POLYESTERS AND FOOD CANS COATED WITH A COMPOSITION COMPRISING SAME

FIELD OF THE INVENTION

The present invention relates to polyesters comprising the reaction product of a polyol and a bis-epoxy reacted with a mono- and/or di-phenolic carboxylic acid and/or ester. The present invention further relates to food cans coated with a composition comprising such polyesters. The present invention further relates to food cans coated with a composition comprising a polyester that has a loss in molecular weight of less than 50% in an acidic medium.

BACKGROUND OF THE INVENTION

The application of various treatment and pretreatment solutions to metals to retard or inhibit corrosion is well established. This is particularly true in the area of metal food and beverage cans. Coatings are applied to the interior of such containers to prevent the contents from contacting the metal of the container. Contact between the metal and the food or beverage can lead to corrosion of the metal container, which can then contaminate the food or beverage. This is particularly true when the contents of the can are acidic in nature, such as tomato-based products and soft drinks. The coatings applied to the interior of food and beverage cans also helps prevent corrosion in the head space of the cans, which is the area between the fill line of the food product and the can lid; corrosion in the head space is particularly problematic with food products having a high salt content.

In addition to corrosion protection, coatings for food and beverage cans should be non-toxic, and should not adversely affect the taste of the food or beverage in the can. Resistance to "popping", "blushing" and/or "blistering" is also desired.

Certain coatings are particularly applicable for application onto coiled metal stock, such as the coiled metal stock from which the ends of cans are made, "can end stock". Since coatings designed for use on can end stock are applied prior to the ends being cut and stamped out of the coiled metal stock, they are also typically flexible and/or extensible. For example, can end stock is typically coated on both sides. Thereafter, the coated metal stock is punched, scored for the "pop-top" opening and the pop-top ring is then attached with a pin that is separately fabricated. The end is then attached to the can body by an edge rolling process. Accordingly, the coating applied to the can end stock typically has a certain degree of toughness and flexibility, such that it can withstand extensive fabrication processes, in addition to some or all of the other desirable features discussed above.

Various epoxy-based coatings and polyvinyl chloride-based coatings have been used in the past to coat the interior of metal cans to prevent corrosion. The recycling of materials containing polyvinyl chloride or related halide-containing vinyl polymers can generate toxic by-products, however; moreover, these polymers are typically formulated with epoxy-functional plasticizers. In addition, epoxy-based coatings are prepared from monomers such as bisphenol A ("BPA"), bisphenol F ("BPF") and diglycidyl ethers of these (i.e. bisphenol A diglycidylether ("BADGE") and bisphenol F diglycidyl ether ("BFDGE"); certain of these compounds have been reported as having negative health effects. While attempts have been made to scavenge the residual unreacted epoxy with, for example, acid functional polymers, this does not adequately address the problem; some free BADGE/BFDGE or their by-products will still remain. Government authorities, particularly in Europe, are restrictive on the amount of free BPA, BPF, BADGE, BFDGE and/or their by-products that are acceptable. Many compositions that meet these requirements, however, can have poor stability, such as polyesters that readily degrade in the presence of acid catalysts. Thus, there is a need for food and beverage can liners that are substantially free from BPA, BPF, BADGE, BFDGE and/or halogenated vinyl products; such can liners having resistance to degradation in acidic media are particularly desired.

SUMMARY OF THE INVENTION

The present invention is directed to a polyester comprising the reaction product of
   a) a polyol; and
   b) a bis-epoxy reacted with a mono- and/or di-phenolic carboxylic acid and/or ester.

The present invention is further directed to food cans coated at least in part on the interior with a composition comprising a polyester comprising the reaction product of
   a) a polyol; and
   b) a bis-epoxy reacted with a mono- and/or di-phenolic carboxylic acid and/or ester,
wherein the composition is substantially free of BPA and BPF and substantially free of BADGE and BFDGE.

The present invention is further directed to food cans coated at least in part on the interior with a composition comprising a polyester that has a loss in molecular weight of less than 50% in an acidic medium.

DETAILED DESCRIPTION OF THE INVENTION

The present invention is directed to a polyester comprising the reaction product of
   a) a polyol; and
   b) a bis-epoxy reacted with a mono- and/or di-phenolic carboxylic acid and/or ester. The term "polyol" is used herein to refer to any compound having two or more hydroxyl groups. Suitable polyols include but are not limited to alkylene glycols, such as ethylene glycol, propylene glycol, diethylene glycol, dipropylene glycol, triethylene glycol, tripropylene glycol, hexylene glycol, polyethylene glycol, polypropylene glycol and neopentyl glycol; hydrogenated Bisphenol A; cyclohexanediol; 1,3-propane diol; glycol; 1,4-butane diol; 1,3-butane diol; butyl ethyl propane diol; trimethyl pentane diol; cyclohexanedimethanol; caprolactonediol, for example, the reaction product of epsilon-caprolactone and ethylene glycol; hydroxy-alkylated bisphenols; polyether glycols, for example, poly(oxytetramethylene) glycol and the like. Polyols of higher functionality may also be used in limited quantity, provided they have no adverse effects on flexibility. Examples include trimethylolpropane, trimethylolethane, pentaerythritol, and the like.

The polyol is reacted with the reaction product of a bis-epoxy and a mono- and/or di-phenolic carboxylic acid and/or ester. The term "bis-epoxy" refers to any compound that has two epoxy groups, such as terminal epoxy groups. Suitable bis-epoxy compounds include diglycidyl esters and/or ethers. Particularly suitable are diglycidyl esters having two phenolic rings that have been hydrogenated, such as Eponex 1510, which is the diglycidyl ether of hydrogenated bisphenol A, commercially available from Hexion, and diglycidyl ethers having one phenolic ring, such as resorcinol diglycidyl ether.

Certain bis-epoxy compounds can have the general formula (I):

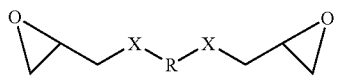

wherein R is an alkyl, cycloalkyl or aryl moiety and each X is the same or different and is either O, $CR_1$ or $NR_1$, wherein $R_1$ is H or alkyl.

It will be appreciated that the epoxy groups of the bis-epoxy react with the hydroxy groups of the phenolic carboxylic acids and/or esters to form a bis-carboxylic acid or a bis-ester. The bis-carboxylic acid or bis-ester is then reacted with a polyol to form a polyester. The bis-epoxy is typically reacted with the phenolic carboxylic acids and/or esters in a ratio of 1.1:2, such as 1.5:2, or 1:1.5, or 1:>1 to 2, or 1:2. Mono-phenolic carboxylic acid/esters are particularly suitable, and include the esters of parahydroxybenzoic acid or "parabens", such as methyl paraben, ethyl paraben, propyl paraben, butyl paraben, isobutyl paraben, isopropyl paraben and/or benzyl paraben. Suitable di-phenolic carboxylic acids/esters include diphenolic acid. It will be appreciated that when using a phenolic carboxylic acid and/or ester with more than one OH group, conditions should be maintained so as to avoid gelling of the product.

Typically, the weight average molecular weight ("Mw") of the polyester will be 4,000 or greater, such as 11,000 or greater such as 14,000 to 15,000 or even greater. It has been discovered that certain polyesters of the present invention have particularly good resistance to degradation in acidic media. More specifically, these polyesters have a loss in molecular weight of less than 50%, such as less than 40%, less than 30%, or less than 20%, in an acidic medium. As demonstrated in the examples, certain polyesters of the present invention, and the coatings into which they are placed, are much more resistant to degradation or loss of molecular weight in acidic media as compared with other polyesters and coatings containing the same. This is a significant discovery, as such degradation can limit the performance of polyester coatings. "Acidic media" and like terms as used herein refer to media in which an acid or acids having a $pK_a$ (or average $pK_a$ if more than one acid is used) of less than 5, such as less than 3, are present in a concentration of about 0.02 equivalents per gram of polyester solids. It will be appreciated that an acidic medium can result when using any number of the acid catalysts typically used for curing polyester based compositions. Resistance to degradation (measured, for example, as loss of molecular weight) in such environments is therefore significant. Whether a polyester or polyester coating has a loss in molecular weight of less than 50%, 40%, 30%, or 20% can be determined by one skilled in the art by placing the polyester or polyester coating into an acidic medium, treating the sample as described in the examples, and measuring molecular weight loss.

In certain embodiments, the polyester incorporates a moiety to which an acrylic can be grafted. For example, such a moiety can be introduced by reacting maleic anhydride with the bis-carboxylic acid/-ester. Other monomers that will graft with acrylic can also be used such as maleic acid, fumaric acid/anhydride, itaconic acid/anhydride, and crotonic acid/anhydride. A graft copolymer can be formed using techniques standard in the art, such as by adding an acrylic monomer to the polyester and polymerizing the acrylic using a free radical initiator.

The present invention is further directed to food cans coated at least in part on the interior with a composition comprising one or more of the polyesters described above. The term "food can(s)" is used herein to refer to cans, containers or any type of metal receptacle or portion thereof used to hold any type of food or beverage. For example, the term "food can(s)" specifically includes "can ends", which are typically stamped from can end stock and used in conjunction with the packaging of beverages.

The compositions are substantially free of BPA and BPF. It will be understood that trace or minor amounts of one or more of these components can be present, such as 10 wt % or less, 5 wt % or less, 2 or even 1 wt % or less, with wt % based on total solids weight, and still be "substantially free of BPA and BPF". The compositions are also substantially free of BADGE and BFDGE. Again, it will be understood that trace or minor amounts of BADGE can be present, such as 10 wt % or less, 5 wt % or less, 2 or even 1 wt % or less, with wt % based on total solids weight, and still be "substantially free of BADGE and BFDGE".

Certain embodiments of the present invention are directed to food cans coated at least in part on the interior with a composition consisting essentially of a polyester that comprises a polyester comprising the reaction-product of
  a) a polyol; and
  b) a bis epoxy reacted with a mono- and/or di-phenolic carboxylic acid and/or ester. These compositions can be substantially free of BPA and BPF and/or substantially free of BADGE and BFDGE.

The compositions used according to the present invention can further comprise a crosslinker. A suitable crosslinker can be determined based upon the needs and desires of the user, and can include, for example, aminoplast crosslinkers, phenolic crosslinkers, blocked isocyanates and 1,3,5-triazine carbamate. Aminoplast crosslinkers can be melamine based, urea based, or benzoguanamine based. Melamine crosslinkers are widely commercially available, such as from Cytec Industries, Inc. as CYMEL 303, 1130, 325, 327, and 370. Phenolic crosslinkers include, for example, novolacs, and resoles; Bisphenol A can also be used as a crosslinker, provided the final product is still "substantially free of BPA". For use on food cans, phenolic resoles that are not derived from bisphenol A are particularly suitable.

The compositions used according to the present invention typically comprise greater than 70 wt % of the polyester described herein, wherein wt % is based on the total solids weight of the composition. Typically, the polyester will be present in a range of 70 to 99 wt %, such as 80 to 99 wt %. The crosslinker is typically present in an amount of 1 to 30 wt %, such as 2 to 5 wt %, again with wt % being based on the total solids weight. In certain embodiments, the wt % of crosslinker in the composition is 10 wt % or less, based on total solids weight, such as 5 wt. % or less.

The compositions used according to the present invention may also comprise a solvent. Suitable solvents include water, esters, glycol ethers, glycols, ketones, aromatic and aliphatic hydrocarbons, alcohols and the like. Particularly suitable are xylenes, propyleneglycol monomethyl acetates, and dibasic ester such as dimethyl esters of adipic, glutaric and succinic acids. Typically, the compositions are prepared so as to be between about 30 and 60 weight percent solids. Alternatively, the compositions can be aqueous. As used herein, "aqueous" means 50% or greater of the non-solid component of the coating is water. Thus it will be understood that the non-solid component of the compositions can comprise up to 50% solvent and still be "aqueous".

The compositions of the present invention can also contain any other conventional additives such as pigments, colorants, waxes, lubricants, defoamers, wetting agents, plasticizers, fortifiers and catalysts. Any mineral or sulfonic acid catalyst can be used. Particularly suitable for food can applications are phosphoric acid and dodecyl benzene sulfonic acid.

The coating compositions described above can be applied to a food can by any means known in the art such as hot melt extrusion, roll coating, spraying, and/or electrocoating. It will be appreciated that for two-piece food cans, the coating will typically be sprayed after the can is made. For three-piece food cans, on the other hand, a coil or sheet will typically be roll coated with one or more of the present compositions first and then the can will be formed. The coating is applied to at least part of the interior of the can, but can also be applied to at least part of the exterior of the can. For can end stock, a coil or sheet will typically be roll coated with one of the present compositions; the coating is then cured and the ends are stamped out and fabricated into the finished product.

After application, the coating is then cured. Cure is affected by methods standard in the art. For coil coating, this is typically a short dwell time (i.e. 9 seconds to 2 minutes) at high heat (i.e. 485° F. peak metal temperature); for coated metal sheets cure is typically longer (i.e. 10 minutes) but at lower temperatures (i.e. 400° F. peak metal temperature).

Any materials used for the formation of food cans can be treated according to the present methods. Particularly suitable substrates include chrome treated aluminum, zirconium treated aluminum, tin-plated steel, tin-free steel, and black-plated steel.

In certain embodiments, the coatings of the present invention can be applied directly to the metal, without any pretreatment or adhesive aid being added to the metal first. In certain other embodiments, such as when making can ends, pretreated aluminum may be desirable. In addition, no coatings need to be applied over top of the coatings used in the present methods. In certain embodiments, the coatings described herein are the last coating applied to the food can.

The compositions used according to the present invention perform as desired both in the areas of flexibility and acid resistance. Significantly, these results can be achieved with a substantially free of BPA and BPF and substantially free of BADGE and BFDGE composition. Thus, the present invention provides particularly desirable coated food cans that avoid performance and health issued raised by other can coatings.

The present invention is further directed to food cans coated at least in part on the interior with a composition comprising a polyester that has a loss in molecular weight of less than 50% in acidic media, such as less than 40%, less than 30%, or less than 20%.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to "a" polyol, "a" bis-epoxy, "a" phenolic acid and/or ester, "a" crosslinker and "a" solvent, one or more of each of these and any other components can be used. As used herein, the term "polymer" refers to oligomers and both homopolymers and copolymers, and the prefix "poly" refers to two or more.

EXAMPLES

The following examples are intended to illustrate the invention and should not be construed as limiting the invention in any way.

Example 1

The reaction product of a bis-epoxy and methyl paraben, "A", was prepared as follows:

TABLE 1

| Ingredients | Charge #1 | Parts by Weight |
|---|---|---|
| EPONEX 1510[1] | | 54.9 |
| Methylparaben | | 38.5 |
| Xylene | | 6.6 |
| Ethyltriphenylphosphonium Iodide | | 0.05 |

[1]EPONEX 1510 epoxy resin from Resolution Performance Products.

Charge #1 was added to a 1-liter, 4-necked flask equipped with a motor driven stainless steel stir blade, water-cooled condenser and a heating mantle with a thermometer connected through a temperature feedback control device. The contents of the flask were heated to 110° C. and held at that temperature for 30 minutes. The temperature was then increased to 160° C. and the batch was allowed to exotherm to 169° C. The batch was then held at 170° C. for 4 hours and 35 minutes, during which time the epoxy equivalent weight increased to >50,000 g/eq.

Example 2

Polyester "B" was made as follows:

TABLE 2

| Ingredients | Parts by Weight |
|---|---|
| Charge #1 | |
| Epoxy resin "A" from Example 1 | 58.3 |
| Ethylene Glycol | 4.8 |
| Dibutyl Tin Oxide | 0.12 |
| Charge #2 | |
| Xylene | 23.0 |
| Charge #3 | |
| DOWANOL PM[1] | 13.8 |

[1]Propylene glycol monomethyl ether used as a solvent, from Dow Chemical.

Charge #1 was added to a 1-liter, 4-necked flask equipped with a motor driven stainless steel stir blade, a packed column, water-cooled condenser, a receiving flask, and a heating mantle with a thermometer connected through a temperature feedback control device. All of the joints were wrapped with Teflon tape to minimize the loss of the methanol by-product from the apparatus. The contents of the flask were heated to reflux (180° C.), and the methanol by-product was distilled off through the column into the receiving flask. During the 5-hour reaction time, the temperature was gradually increased to 215° C. to keep the distillation going. When there was no longer any methanol being collected, the reaction mixture was cooled to 100° C. and Charge #2 was added. The mixture was stirred for 25 minutes, and then thinned with Charge #3.

Example 3

Polyester "C" was made as follows:

TABLE 3

| Ingredients | Parts by Weight |
|---|---|
| *Charge #1* | |
| Epoxy resin "A" from Example 1 | 63.0 |
| Ethylene Glycol | 5.5 |
| Dibutyl Tin Oxide | 0.13 |
| *Charge #2* | |
| Maleic anhydride | 2.4 |
| *Charge #3* | |
| DOWANOL PM[1] | 29.0 |

[1]Propylene glycol monomethyl ether used as a solvent, from Dow Chemical.

Charge #1 was added to a 1-liter, 4-necked flask equipped with a motor driven stainless steel stir blade, a packed column, water-cooled condenser, a receiving flask, and a heating mantle with a thermometer connected through a temperature feedback control device. All of the joints were wrapped with Teflon tape to minimize the loss of the methanol by-product from the apparatus. The contents of the flask were heated to reflux (170° C.), and the methanol by-product was distilled off through the column into the receiving flask. During the 5-hour reaction time, the temperature was gradually increased to 195° C. to keep the distillation going. When there was no longer any methanol being collected, the reaction mixture was cooled to 121° C. and Charge #2 was added. The reaction mixture was held for 50 minutes during which time it exothermed to 131° C. The mixture was thinned with Charge #3, cooled to 80° C., and stirred for 1 hour.

Example 4

Polyester "C" was dispersed as follows:

TABLE 4

| Ingredients | Parts by Weight |
|---|---|
| *Charge #1* | |
| Polyester "C" from Example 3 | 42.3 |
| Dimethylethanolamine | 1.0 |
| *Charge #2* | |
| Deionized Water | 56.7 |

Charge #1 was added to a 1-liter, 4-necked flask equipped with a motor driven stainless steel stir blade, a water-cooled condenser, and a heating mantle with a thermometer connected through a temperature feedback control device. The contents of the flask were heated to 60° C. and held at that temperature for 30 minutes. Charge #2 was added over 4 hours.

Example 5

Two different samples were prepared by charging polyester B, prepared as described in Example 2, into a container and mixing in the following ingredients in the order shown in Table 5 under ambient conditions until homogeneous.

TABLE 5

| Ingredient | Sample 1 | Sample 2 |
|---|---|---|
| Polyester B | 53.3 parts | 55.3 parts |
| Phenolic crosslinker[1] | 3.4 | 2.6 |
| Phosphoric acid[2] | 5.1 | 5.1 |
| p-Toluenesulfonic acid | 0.9 | 0.9 |
| Solvent[3] | 37.3 | 36.1 |

[1]METHYLON 75108 solution from Durez Corporation
[2]Ortho phosphoric acid solution diluted to 10% by weight with isopropanol
[3]Solvent is 1/1/1 ethyl acetate/DOWANOL PM/dibasic ester Coatings were prepared by drawing Samples 1-2 over Cr-treated aluminum sheets with a #18 wire-wound rod. The coatings were baked for 10 seconds at 450° F. The coated sheets were evaluated for flexibility by bending and stamping wedges (2.0 inch by 4.5 inches). For wedge bends, the percent of coating that cracked or crazed along the bend was determined (100=crazed/no cure). The average flexibility was calculated from the results of three wedges. To measure surface cure, the coating was rubbed with methyl ethyl ketone (MEK=number of double rubs before the coating breaks through to the substrate). The resistance properties of the coated sheets were measured by processing (retorting) them in two food simulants for 30 minutes at 127° C. The two simulants were a 2% by weight solution of citric acid in deionized water and a 3% by weight solution of acetic acid in deionized water. Immediately upon removal from the retort solution, the coatings were evaluated on their ability to resist blushing using a visual scale of 0-4 with 0 being the best. For the adhesion test, the coatings were scored in a crosshatch pattern and covered with adhesive tape; the tape was pulled off and the percent of coating that remained intact was recorded (100=no pick-off). The tensile strength was measured by an Instron Mini 44 Unit with a 50N load cell at a crosshead speed of 10 mm/min using free films of approximately 25.4 mm in length, 12.7 mm in width, 0.3 mm in thickness, and a 1 inch gauge length. The Tg was measured by differential scanning calorimetry (DSC). All of the results are presented in Table 6.

TABLE 6

| Sample | Polymer | MEK | Avg Flex | 2% Citric Acid Blush | 2% Citric Acid Adh | 3% Acetic Acid Blush | 3% Acetic Acid Adh | Tg (DSC) | Tensile (Mpa) |
|---|---|---|---|---|---|---|---|---|---|
| 1 | B | 30 | 15 | 1 | 100 | 1 | 100 | 67 | 22 |
| 2 | B | 20 | 22 | 1 | 100 | 0.5 | 100 | NT | NT |

Comparative Example 1

Polyester "D" was made as follows:

TABLE 7

| Ingredients | Parts by Weight |
|---|---|
| Charge #1 | |
| 1,3-Butylene Glycol | 21.6 |
| Ethylene Glycol | 4.2 |
| Charge #2 | |
| 1,4-Cyclohexanedicarboxylic Acid | 31.7 |
| Isophthalic Acid | 13.1 |
| Maleic Anhydride | 2.2 |
| Dibutyltin Oxide | 0.2 |
| Methyl Hydroquinone | 0.01 |
| Charge #3 | |
| Xylene | 3.3 |
| Charge #4 | |
| Xylene | 23.7 |

Charge #1 was added to a 12-liter, 4-necked flask equipped with a motor driven stainless steel stir blade, a packed column, water-cooled condenser, a receiving flask, and a heating mantle with a thermometer connected through a temperature feedback control device. The contents of the flask were heated to 125° C. and Charge #2 was added to the flask. The reaction mixture was heated to 148° C., and the water by-product was distilled off through the column into the receiving flask. During the 16-hour reaction time, the temperature was gradually increased to 200° C. to keep the distillation going. When there was no longer any water being collected, the reaction mixture was cooled to 189° C., the packed column was replaced with a Dean-Stark apparatus filled with xylene, and Charge #3 was added. The mixture was heated at reflux (188-200° C.) for an additional 8 h, and then thinned with Charge #4.

Example 6

Four different samples were prepared by charging polyester B or D, prepared as described in Example 2 or Comparative Example 1, respectively, into glass jars and mixing in the following ingredients in the order shown in Table 8 under ambient conditions until homogeneous.

TABLE 8

| Ingredient | Sample 1 | Sample 2 | Sample 3 | Sample 4 |
|---|---|---|---|---|
| Polyester B | 100 parts | 90.0 parts | 0 | 0 |
| Polyester D | 0 | 0 | 100 parts | 89.6 parts |
| Phosphoric acid[1] | 0 | 8.5 | 0 | 8.9 |
| p-Toluene-sulfonic acid | 0 | 1.5 | 0 | 1.5 |

[1]Ortho phosphoric acid solution diluted to 10% by weight with isopropanol

The samples were tested for resistance to degradation by placing them in a 120 F hot room. Polymer degradation was quantified by reduction in weight average molecular weight ($M_w$) as measured by gel permeation chromatography (GPC). Samples for GPC were taken weekly up through five weeks of aging in the hot room. The results are summarized in Table 9.

TABLE 9

| Sample | Mw initial | % loss in Mw, 1 wk | % loss in Mw, 2 wks | % loss in Mw, 5 wks |
|---|---|---|---|---|
| 1 | 14929 | 0.3 | 3.8 | 2.9 |
| 2 | 14929 | 6.1 | 10.5 | 16.0 |
| 3 | 10844 | 0.0 | 0.5 | |
| 4 | 10293 | 61.6 | 73.6 | |

Whereas particular embodiments of this invention have been described above for purposes of illustration, it will be evident to those skilled in the art that numerous variations of the details of the present invention may be made without departing from the invention as defined in the appended claims.

Therefore we claim:

1. A food can coated at least in part on the interior with a composition comprising a polyester comprising the reaction product of
   a) a polyol; and
   b) a bis-epoxy reacted with a mono- and/or di-phenolic carboxylic acid and/or ester,
   wherein the composition is substantially free of BPA and BPF and substantially free of BADGE and BFDGE.

2. The food can of claim 1, wherein the weight average molecular weight of the polyester is 14,000 to 15,000.

3. The food can of claim 1, wherein the wt % of polyester in the composition is 70 to 99 wt %, based on total solids weight.

4. The food can of claim 1, wherein the polyol is ethylene glycol.

5. The food can of claim 1, wherein the bis-epoxy comprises hydrogenated bisphenol A moieties.

6. The food can of claim 1, wherein the composition, when cured, is the last coating applied to the can.

7. The food can of claim 1, wherein the carboxylic acid comprises diphenolic acid.

8. The food can of claim 1, wherein the carboxylic ester comprises a paraben.

9. The food can of claim 8, wherein the paraben comprises methyl paraben.

10. The food can of claim 1, wherein the coating further comprises an acrylic grafted to the polyester.

11. The food can of claim 1, wherein the composition further comprises a solvent.

12. The food can of claim 1, wherein the coated portion of the food can comprises a can end.

13. A food can coated at least in part on the interior with a composition consisting essentially of a polyester comprising the reaction product of
   a) a polyol; and
   b) a bis-epoxy reacted with a mono- and/or di-phenolic carboxylic acid and/or ester.

14. The composition of claim 13, wherein the composition is substantially free of BPA and BPF and substantially free of BADGE and BFDGE.

15. A food can coated at least in part on the interior with a composition comprising a polyester that has a loss in molecular weight of less than 50% in an acidic medium.

16. The food can of claim 15, coated at least in part on the interior with a composition comprising a polyester that has a loss in molecular weight of less than 40% in an acidic medium.

17. The food can of claim 15, coated at least in part on the interior with a composition comprising a polyester that has a loss in molecular weight of less than 30% in an acidic medium.

18. The food can of claim 15, coated at least in part on the interior with a composition comprising a polyester that has a loss in molecular weight of less than 20% in an acidic medium.

19. A polyester comprising the reaction product of
a) a polyol; and
b) a bis-epoxy reacted with a mono- and/or di-phenolic carboxylic acid and/or ester.

20. The polyester of claim 19, wherein the polyol is ethylene glycol.

21. The polyester of claim 19, wherein the bis-epoxy comprises hydrogenated bisphenol A moieties.

22. The polyester of claim 19, wherein the carboxylic acid comprises diphenolic acid.

23. The polyester of claim 19, wherein the carboxylic ester comprises a paraben.

24. The polyester of claim 23, wherein the paraben comprises methyl paraben.

* * * * *